United States Patent [19]

Karden

[11] Patent Number: 4,643,263

[45] Date of Patent: Feb. 17, 1987

[54] PORTABLE POWER TOOL

[75] Inventor: Karl G. Karden, Nacka, Sweden

[73] Assignee: Atlas Copco Aktiebolag, Nacka, Sweden

[21] Appl. No.: 651,620

[22] Filed: Sep. 17, 1984

[30] Foreign Application Priority Data

Sep. 16, 1983 [SE] Sweden ................................ 8304986

[51] Int. Cl.[4] .............................................. B23B 45/04

[52] U.S. Cl. .................................... 173/168; 173/169; 173/170

[58] Field of Search ........................ 173/168, 169, 170; 16/12

[56] References Cited

U.S. PATENT DOCUMENTS 3,446,294 5/1969 Bailey et al. .................... 173/168 X 3,571,874 3/1971 Arx ................................ 173/169 X 3,934,657 1/1976 Danielson ........................... 173/169

4,036,085 7/1977 Sjostrand et al. ............... 173/169 X

*Primary Examiner*—E. R. Kazenske

*Assistant Examiner*—Willmon Fridie, Jr.

*Attorney, Agent, or Firm*—Frishauf, Holtz, Goodman & Woodward

[57] ABSTRACT

A hand held pneumatic grinding tool is provided with two angularly spaced handles (12, 13), one containing an air supply passage (16) and a throttle valve, the other an air exhaust passage (17) and a silencer (15). Both handles (12, 13) are adjustably mounted on the tool housing (10) by means of arc-shaped mountings. These comprise opposed arc-shaped V-grooves (22, 23 and 37, 38) on the housing (10) and mating V-ridges (24, 25 and 35, 36) on the handles (12, 13). Arc-shaped wedge elements (27, 43) are retained by clamping bolts (28, 44) to engage one of the V-ridges (24, 25 and 35, 36) on each handle and, thereby, locking the handles (12, 13) in desired positions relative to the housing (10).

5 Claims, 7 Drawing Figures

PORTABLE POWER TOOL

BACKGROUND OF THE INVENTION

This invention relates to a portable power tool which comprises a housing, a rotation motor driving an output spindle and at least one handle mounted by its inner end on the housing.

A problem concerned with power tools of this type is that the positions of the handle or handles are not adjustable such that a safe and comfortable working position for the operator is obtainable under different tool operating conditions.

The main object of the invention is to accomplish a portable power tool having at least one handle mounted on the tool housing by means of a mounting or mountings which provide for an angular adjustability of the handles relative to the tool housing.

Another object of the invention is to accomplish a portable power tool having adjustable handles the mountings of which comprise connection means for enabling power supply to the motor via one of the handles.

Further objects and advantages will appear from the specification and the claims.

In the accompanying drawing figures there is shown a preferred embodiment of the invention.

DETAILED DESCRIPTION

Figure 7:
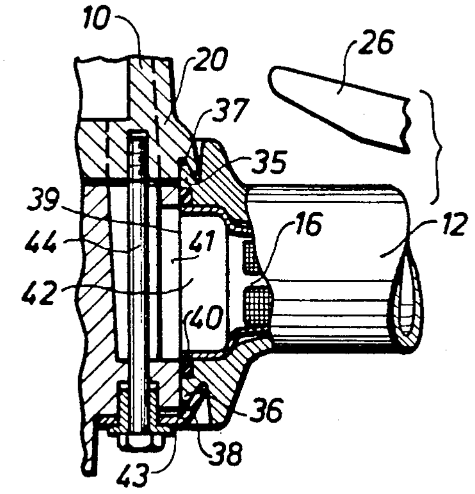
FIG. 7 is a fractional side view, partly in section, of the air supply handle mounting.

In the drawings there is shown a pneumatically powered portable grinding machine which comprises a housing 10, an air motor (not shown) mounted in the housing and rotating an output spindle 11, and two handles 12,13. One of the handles, 12, contains a pressure air supply passage 16 (see FIG. 7) by which the motor is connectable to a pressure air source via a conduit 14. A throttle valve in the handle 12 is operable by a lever 26 to control the motor operation.

Figure 3:
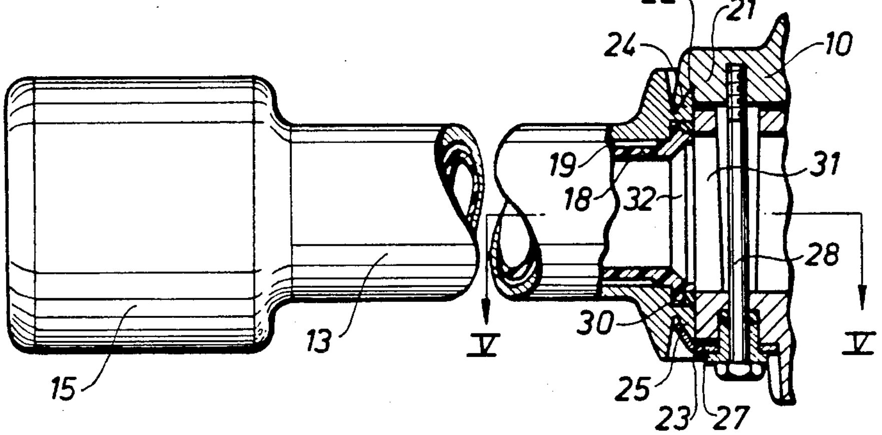
FIG. 3 is a fractional side view, partly in section, of the exhaust passage containing handle.

The other handle 13 comprises an exhaust passage 17 (see FIGS. 3 and 5) through which the motor outlet communicates with the atmosphere. A silencer 15 is mounted at the outer end of the handle 13. The exhaust passage 17 is lined with a heat insulating sleeve 18 of a synthetic resin. A circumferential air gap 19 between the sleeve 18 and the handle body serves to improve the heat insulating effect. Without this lining the handle would be uncomfortably cold to the operator due to the attenuated low temperature exhaust air from the motor.

Figure 1:
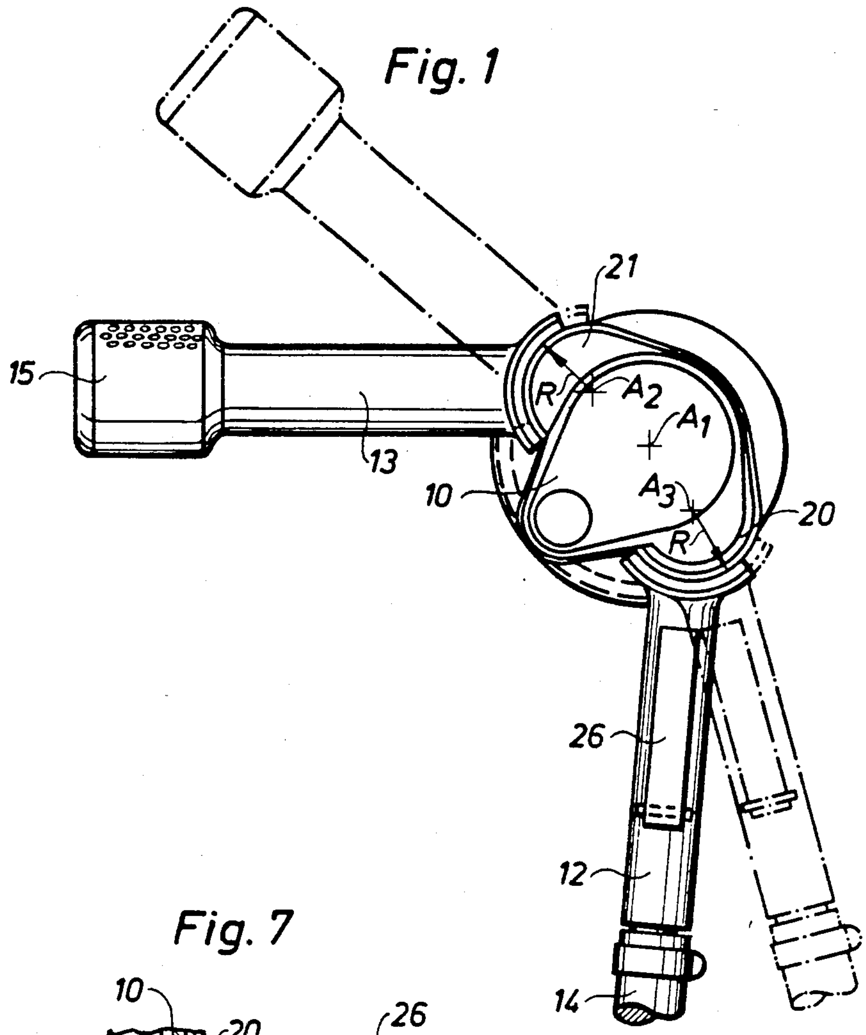
FIG. 1 shows a top view of a pneumatic grinding machine provided with two adjustable handles according to the invention.

The handles 12, 13 are attached to the housing 10 by means of adjustable mountings, which make it possible to selectively vary the angular relation between the handles 12, 13. This means that the handles are adjustable to meet the actual and individual demands as regards a safe and comfortable working position for the operator. In FIG. 1 the handles are both shown both in their closest positions (continuous lines), and in their most spread-out positions (dash-dotted lines).

Figure 4:
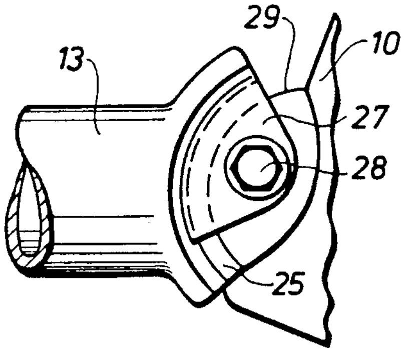
FIG. 4 is a fractional bottom view of the exhaust handle mounting.
Figure 5:
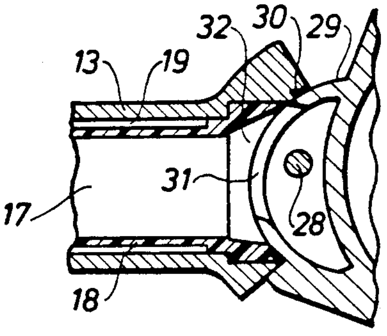
FIG. 5 is a section along line V—V in FIG. 3.

The mountings of the two handles 12, 13 are identical. As can be seen in FIGS. 1, 4, 5, the housing 10 is formed with arc-shaped portions 20, 21 both defined by a constant radius R extending transversely relative to the output spindle 11 of the tool. In other words, the arc-shaped portions 20, 21 have geometric axes $A_2$, $A_3$ which extend in parallel with the geometric axis $A_1$ of the output spindle 11. The radius R of the arc-shaped portions 20, 21, however, is shorter than each of the distances between the inner ends of the handles and the geometric axis $A_1$ of the output spindle 11.

Figure 6:
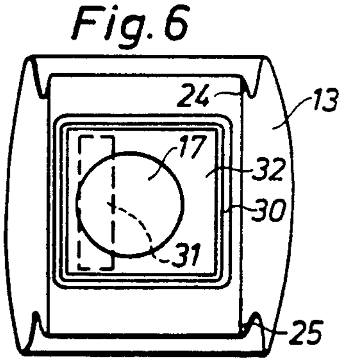
FIG. 6 shows an end view of the inner end of the exhaust handle.

The exhaust handle mounting comprises two opposed arc-shaped V-grooves 22, 23 on the housing 10 in which mating arc-shaped V-ridges 24, 25 on the handle 13 are received. The V-groove 23 at the lower end of the housing 10 is partly defined by an arc-shaped wedge element 27 which is retained by a clamping bolt 28. Between the V-grooves 22, 23 there is a cylindrical surface 29 on the housing 10 for cooperation with a seal element 30 carried by the handle 13 to seal off an exhaust air communication opening 31 in the housing 10 and the exhaust passage 17 in the handle 13 from the atmosphere. At its inner end, the handle 13 is provided with an enlarged opening 32 which is surrounded by the seal element 30 and which is large enough to encircle fully the opening 31 in the housing 10, no matter what the angular position of the handle 13 is. The opening 31 in the housing 10 as well as the opening 32 in the handle 13 and the seal element 30 are of rectangular shape, as illustrated in FIG. 6. The smaller housing opening 31 is illustrated in dash lines.

As being apparent from FIGS. 1, 4, 5, the opening 32 at the inner end of the exhaust handle 13 is offset some 10° from the centre line of the handle. Due to this and due to the fact that the handle is symmetric about the central section plane shown in FIG. 5 handle 13 could be mounted upside-down or in two alternative, 180° turned-over positions. Thereby, the angular adjustability of the exhaust handle is increased by approx. 20°. In the illustration in FIG. 1 this feature has been used to obtain as wide an adjustment range as possible for the handle 13.

Figure 2:
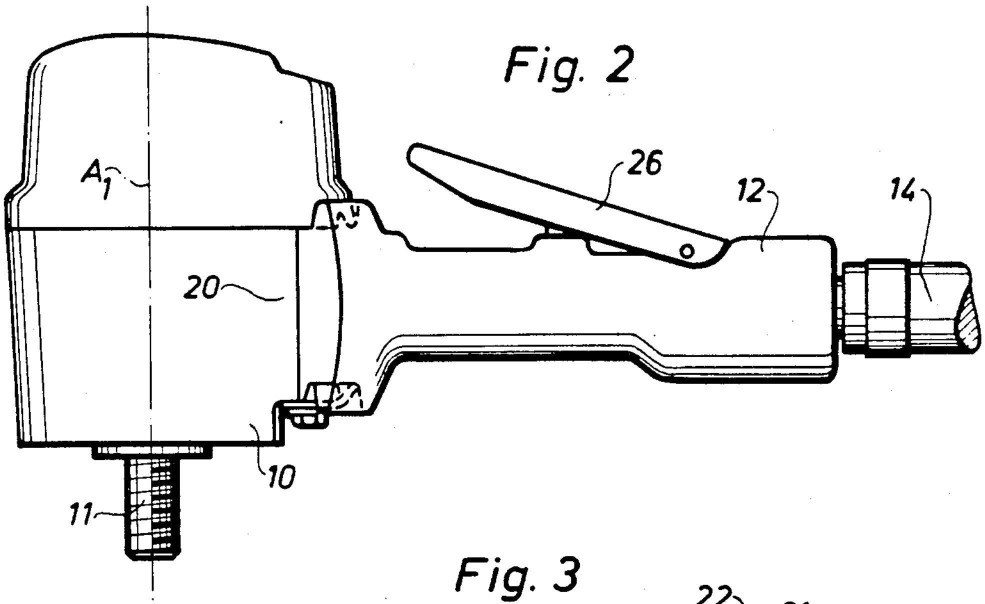
FIG. 2 is a side view of the machine of FIG. 1.

Also the mounting of the handle 12 is symmetric about a central horizontal plane, which makes this handle too shiftable between two alternative positions. In the position shown in FIGS. 1 and 2, the handle 12 is mounted with the throttle valve lever 26 on top. When turned upside-down, the lever 26 will be located underneath the handle. By mounting the handle 12 in alternative positions it is possible to change the throttle valve lever 26 position so as to suit the operators requirements as regards comfortable handling of the tool. There is, however, no excentricity in the air supply passage that would extend the adjustability of the handle 12 when mounting it upside-down or vice versa.

Identically to the exhaust handle 13, the air supply handle 12 is formed with two oppositely directed V-ridges 35, 36 which are received in two mating V-grooves 37, 38 on the housing 10. See FIG. 7. A cylindrical surface 39 on the housing 10 sealingly cooperates with a seal element 40 on the handle 12 to seal off a communication opening 41 in the housing 10 and the enlarged end opening 42 of the air supply passage 16 in the handle 12 from the atmosphere.

An arc-shaped wedge element 43 and a clamping bolt 44 are arranged to lock the handle 12 relative to the housing 10.

The exhaust handle 13 is mounted onto the tool housing 10 in that the arc-shaped V-ridge 24, is introduced into the V-groove 22, and that the wedge element 27 is clamped against the V-ridges 25 by tightening bolt 28. By wedge action on the V-ridges 24, 25 the handle 13 including seal 30 is pressed against the cylindrical surface 29, thereby locking the handle 13 against movement and sealing off the exhaust passage 17 from the atmosphere.

When the exhaust handle position is to be adjusted, the clamp bolt 28 is slackened, the handle is moved into its new position whereafter the clamp bolt 28 is retightened. If the handle is going to be turned upside-down for increasing the angular adjustability the clamp bolt 28 has to be threaded out as far as possible or be removed to make free passage for the V-ridge 25 past the wedge element 27. When turned around, the handle is refitted and locked as described above. Mounting and adjustment of the air supply handle 12 is carried out in a manner identical to that described above regarding the exhaust handle 13.

I claim:

1. A portable power tool, comprising:

a housing;

a motor mounted in said housing for rotating an output spindle about a rotation axis;

at least one handle having an inner end mounted to said housing and extending substantially perpendicularly to said rotation axis of said output spindle;

said housing including at least one handle support means which has a part-cylindrical contact surface the axis of which extends substantially in parallel with said rotation axis of said output spindle;

said at least one handle being adjustably coupled to said housing, and including mounting means having a part-cylindrical mounting surface, said mounting means being cooperatively coupled with and having substantially the same radius for said mounting surface as said part-cylindrical contact surface, said mounting surface having a shorter circumferential extent than said contact surface for enabling angular adjustment of said at least one handle relative to said housing about an axis substantially parallel to said rotation axis; and clamping means for clamping the mounting surface of said mounting means against said contact surface in a substantially radial direction to lock said at least one handle at a desired angular position relative to said housing.

2. The power tool of claim 1, comprising:

first passage means penetrating said part-cylindrical contact surface of said at least one handle support means; and second passage means extending through said part-cylindrical mounting surface of said mounting means of said at least one handle;

said first passage means being arranged to register with said second passage means regardless of the clamped angular position of said at least one handle relative to said housing for providing continuous communication of a fluid power supply means through said at least one handle to the motor in said housing.

3. The power tool of claim 2, wherein said first passage means (31, 41) has a smaller cross section than said second passage means (32, 42) and is fully encircled by the latter regardless of the clamped angular position of said at least one handle.

4. The power tool of any one of claims 1, 2 or 3, wherein said part-cylindrical contact surface (29, 39) has a radius (R) which is shorter than the distance between the inner end of said at least one handle (12, 13) when mounted on said housing (10) and said rotation axis ($A_1$) of said output spindle (11).

5. The power tool of claim 1, wherein:

each of said at least one handle support means on said housing (10) comprises two opposed arc-shaped V-grooves (22, 23; 37, 38);

said mounting means of said at least one handle comprises two oppositely directed arc-shaped V-ridges (24, 25; 35, 36) arranged to cooperate with said arc-shaped V-grooves; and said clamping means comprises a wedge element (27; 43) which forms part of one of said two V-grooves (22, 23; 37, 38).

* * * * *